(12) United States Patent
Tervo et al.

(10) Patent No.: US 11,131,807 B2
(45) Date of Patent: Sep. 28, 2021

(54) PUPIL EXPANDER WITH IMPROVED COLOR UNIFORMITY

(71) Applicant: Microsoft Technology Licensing, LLC, Redmond, WA (US)

(72) Inventors: Jani Kari Tapio Tervo, Espoo (FI); Ari Juhani Tervonen, Vantaa (FI); Heikki Juhana Hyvarinen, Kauniainen (FI)

(73) Assignee: Microsoft Technology Licensing, LLC, Redmond, WA (US)

(*) Notice: Subject to any disclaimer, the term of this patent is extended or adjusted under 35 U.S.C. 154(b) by 20 days.

(21) Appl. No.: 16/799,499

(22) Filed: Feb. 24, 2020

(65) Prior Publication Data
US 2020/0192025 A1    Jun. 18, 2020

Related U.S. Application Data

(63) Continuation-in-part of application No. 16/222,097, filed on Dec. 17, 2018, now Pat. No. 10,670,805, (Continued)

(51) Int. Cl.
*G02B 6/124* (2006.01)
*G02B 27/01* (2006.01)
(Continued)

(52) U.S. Cl.
CPC ......... *G02B 6/124* (2013.01); *G02B 6/29334* (2013.01); *G02B 6/34* (2013.01);
(Continued)

(58) Field of Classification Search
None
See application file for complete search history.

(56) References Cited

U.S. PATENT DOCUMENTS 4,946,245 A    8/1990    Chamberlin et al.
5,081,615 A    1/1992    Sunagawa
(Continued)

FOREIGN PATENT DOCUMENTS

WO    2006064334 A1    6/2006
WO    2016020643 A1    2/2016

OTHER PUBLICATIONS

"Notice of Allowance Issued in U.S. Appl. No. 15/609,882", dated Sep. 12, 2018, 10 Pages.
(Continued)

*Primary Examiner* — Jerry Rahll
(74) *Attorney, Agent, or Firm* — Alleman Hall Creasman & Tuttle LLP

(57) ABSTRACT

An optical waveguide comprises one or more upstream diffraction gratings in addition to overlapping first and second downstream diffraction gratings. The one or more upstream diffraction gratings include a first upstream diffraction grating configured to receive display light and to release the display light expanded along a first axis. The first and second downstream diffraction gratings are configured to receive the display light expanded along the first axis and to cooperatively release the display light further expanded along a second axis. The first downstream diffraction grating is arranged on a planar face of the optical waveguide and is further configured to further expand along the first axis the display light expanded along the first axis.

20 Claims, 9 Drawing Sheets

Related U.S. Application Data which is a continuation of application No. 15/609,882, filed on May 31, 2017, now Pat. No. 10,175,423.

(51) Int. Cl.
| | | |
|---|---|---|
| *G02B 27/00* | (2006.01) | |
| *G02B 6/34* | (2006.01) | |
| *G02B 6/293* | (2006.01) | |
| *G02B 6/43* | (2006.01) | |
| *F21V 8/00* | (2006.01) | |

(52) U.S. Cl.
CPC ..... *G02B 27/0081* (2013.01); *G02B 27/0172* (2013.01); *G02B 6/0026* (2013.01); *G02B 6/29323* (2013.01); *G02B 6/43* (2013.01); *G02B 2027/0125* (2013.01); *G02B 2027/0178* (2013.01)

(56) References Cited

U.S. PATENT DOCUMENTS

| | | |
|---|---|---|
| 6,790,697 B2 | 9/2004 | Kobayashi et al. |
| 7,400,399 B2 | 7/2008 | Wawro et al. |
| 8,160,411 B2 | 4/2012 | Levola et al. |
| 8,233,204 B1 | 7/2012 | Robbins et al. |
| 8,320,032 B2 | 11/2012 | Levola |
| 8,508,848 B2 | 8/2013 | Saarikko |
| 8,546,899 B2 | 10/2013 | Takabayashi |
| 8,619,363 B1 | 12/2013 | Coleman |
| 8,654,420 B2 | 2/2014 | Simmonds |
| 9,310,566 B2 | 4/2016 | Valera et al. |
| 9,654,420 B2 | 5/2017 | Kariya |
| 9,791,703 B1 | 10/2017 | Vallius et al. |
| 9,939,628 B2 | 4/2018 | Basset et al. |
| 10,175,423 B2 | 1/2019 | Tervo |
| 10,241,346 B2 | 3/2019 | Tervo |
| 10,546,523 B2 | 1/2020 | Bohn |
| 2003/0123827 A1 | 7/2003 | Salerno et al. |
| 2009/0303599 A1 | 12/2009 | Levola |
| 2012/0014837 A1 | 1/2012 | Fehr et al. |
| 2013/0170784 A1 | 7/2013 | Kim et al. |
| 2014/0112613 A1 | 4/2014 | Hsieh et al. |
| 2014/0300966 A1 | 10/2014 | Travers et al. |
| 2015/0346490 A1 | 12/2015 | Tekolste et al. |
| 2016/0238772 A1 | 8/2016 | Waldern et al. |
| 2016/0266331 A1 | 9/2016 | Hutchison et al. |
| 2016/0327705 A1 | 11/2016 | Simmonds et al. |
| 2017/0299799 A1 | 10/2017 | Fattal |
| 2017/0299865 A1 | 10/2017 | Vallius et al. |
| 2017/0307886 A1 | 10/2017 | Stenberg et al. |
| 2017/0315346 A1 | 11/2017 | Tervo et al. |
| 2017/0322426 A1 | 11/2017 | Tervo |
| 2017/0357841 A1 | 12/2017 | Popovich et al. |
| 2018/0052276 A1 | 2/2018 | Klienman et al. |
| 2018/0203230 A1 | 7/2018 | Vallius et al. |
| 2018/0292653 A1 | 10/2018 | Tervo |
| 2019/0056591 A1 | 2/2019 | Tervo et al. |
| 2019/0107723 A1 | 4/2019 | Lee et al. |

OTHER PUBLICATIONS

"Non Final Office Action Issued in U.S. Appl. No. 16/222,097", dated Aug. 29, 2019, 13 Pages.

"Notice of Allowance Issued in U.S. Appl. No. 16/222,097", dated Feb. 11, 2020, 8 Pages.

Han, et al., "Portable Waveguide Display System with a Large Field of View by Integrating Freeform Elements and Volume Holograms", in Journal of Optics Express, vol. 23, Issue 3, Feb. 4, 2015, pp. 3534-3549.

"International Search Report & Written Opinion Issued in PCT Application No. PCT/US21/014051", dated Apr. 1, 2021, 10 Pages.

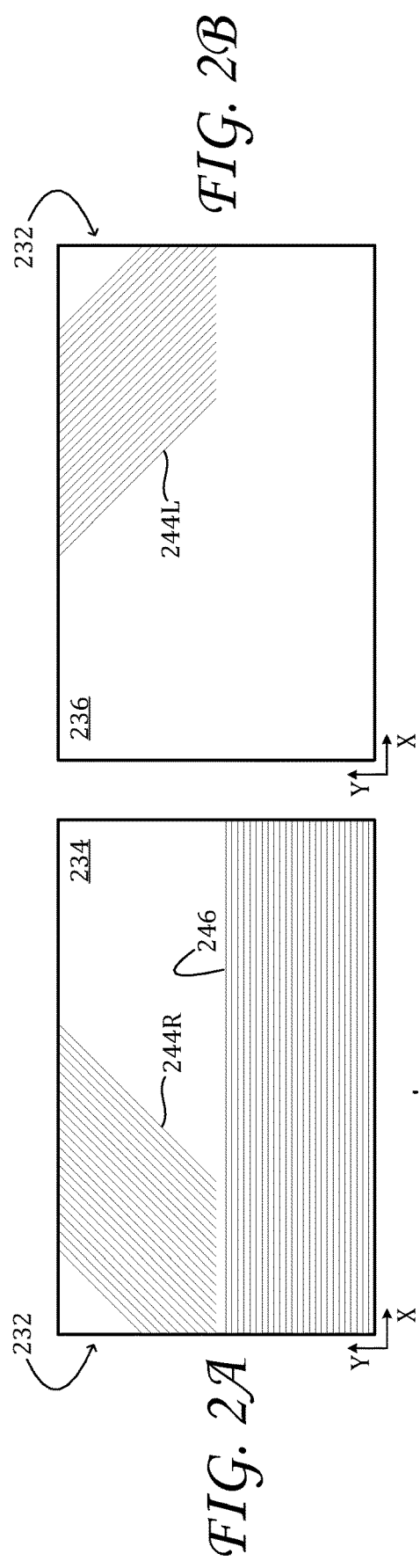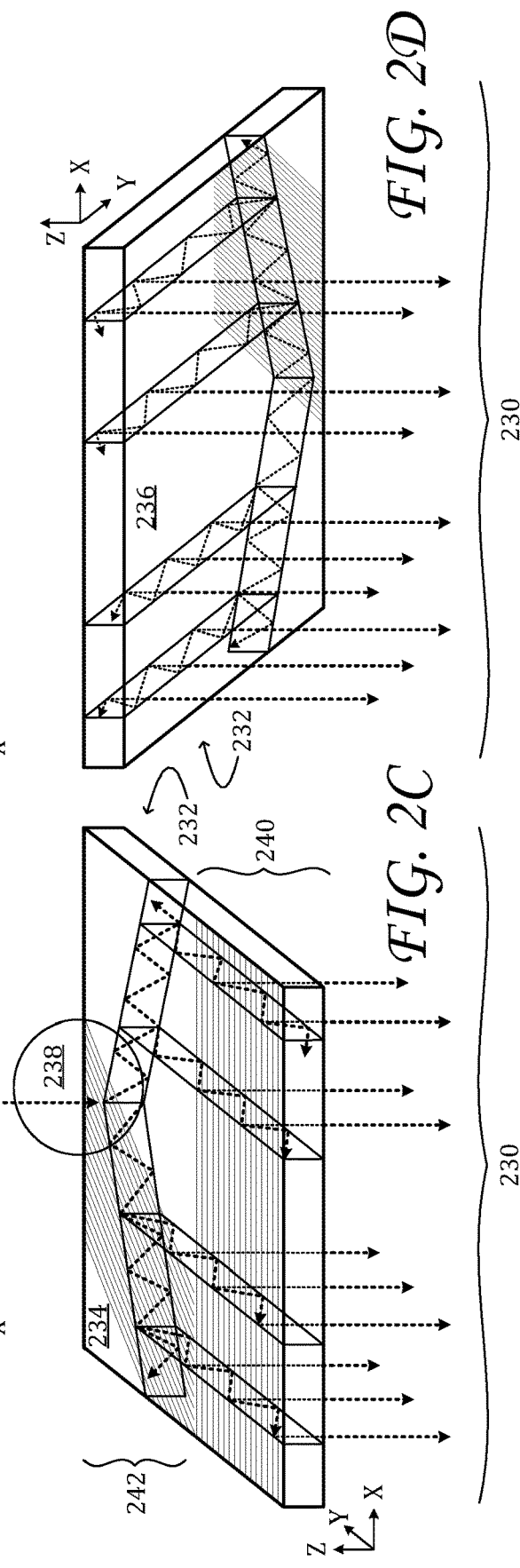

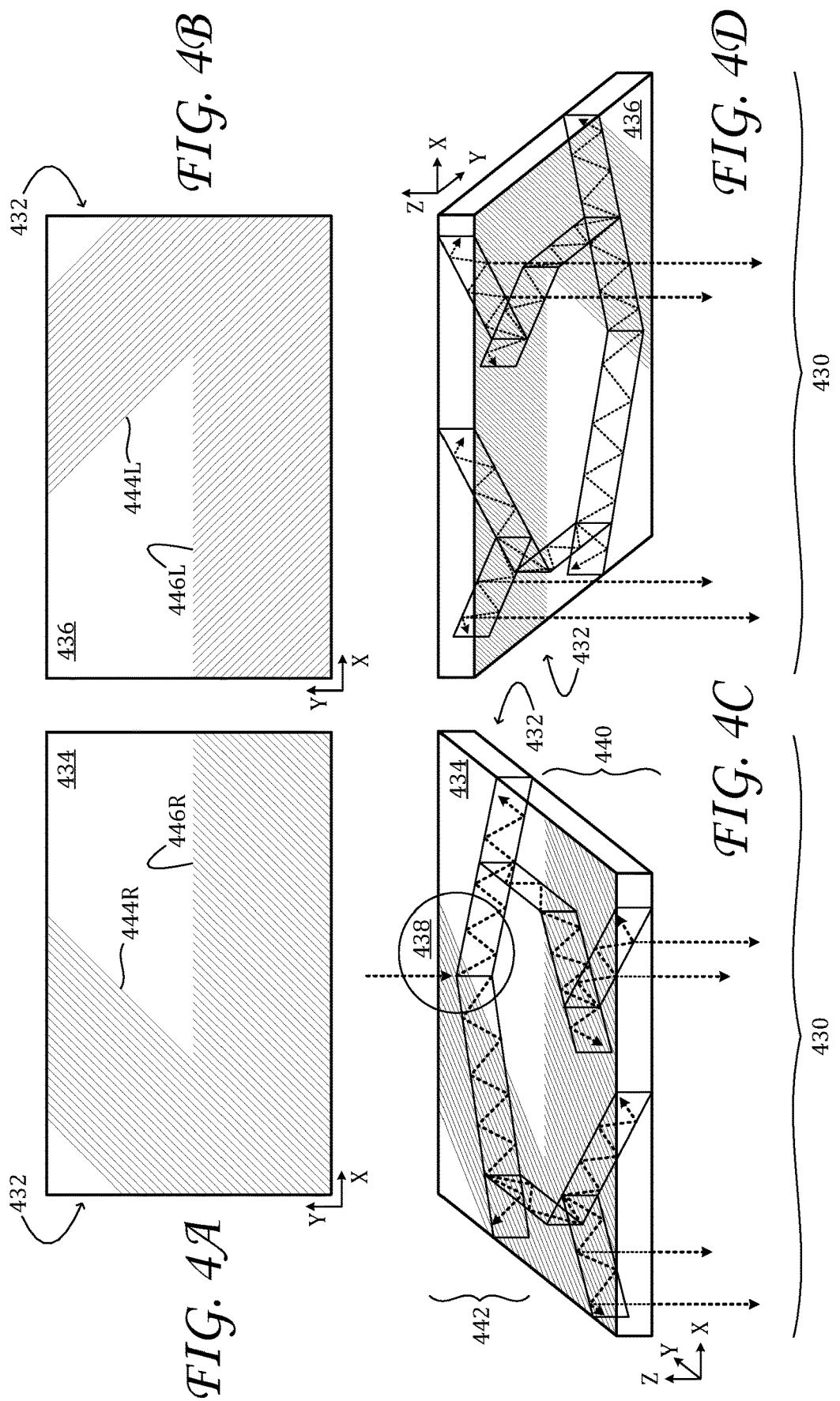

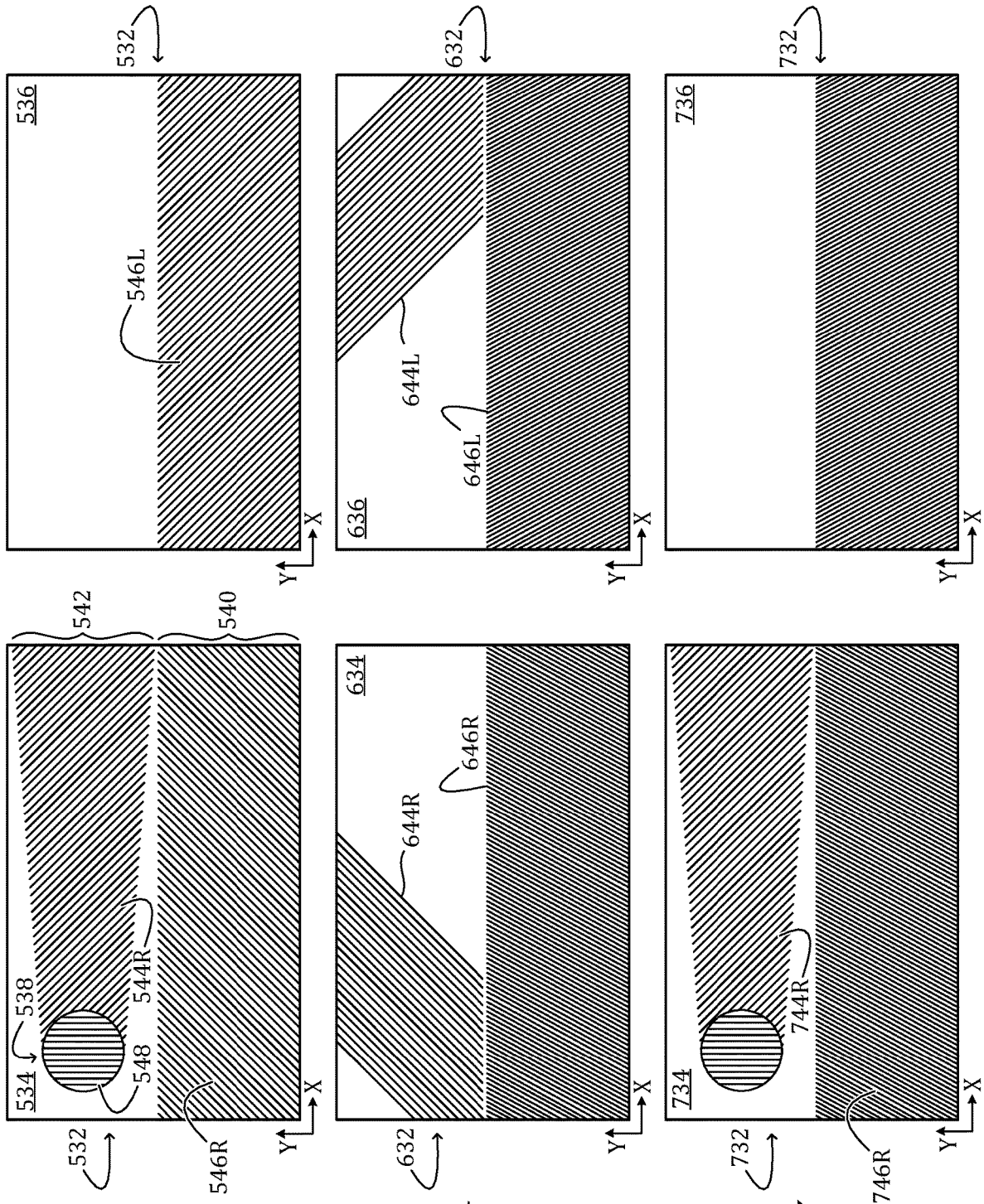

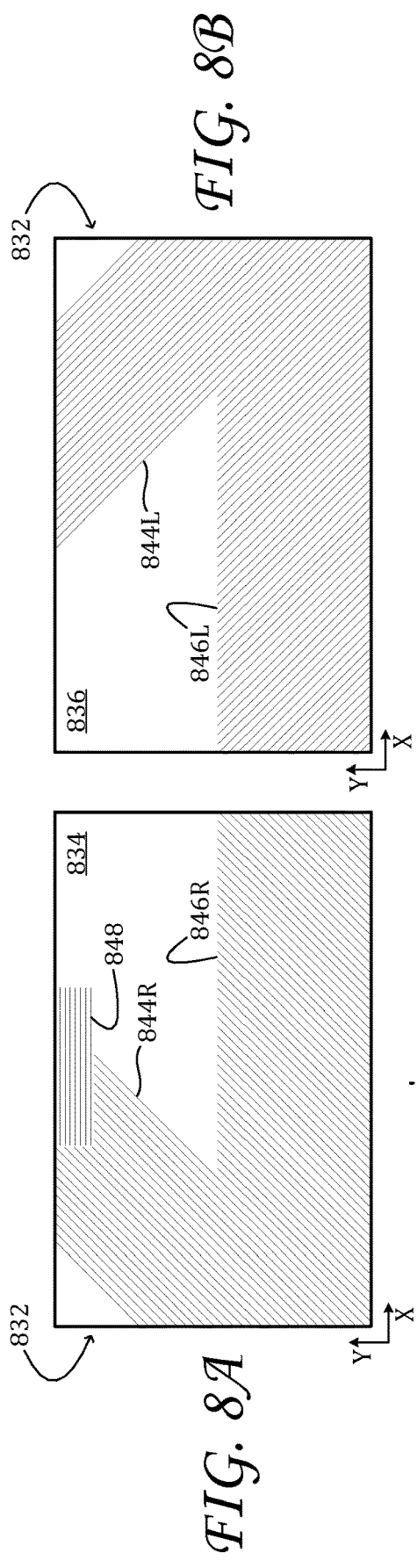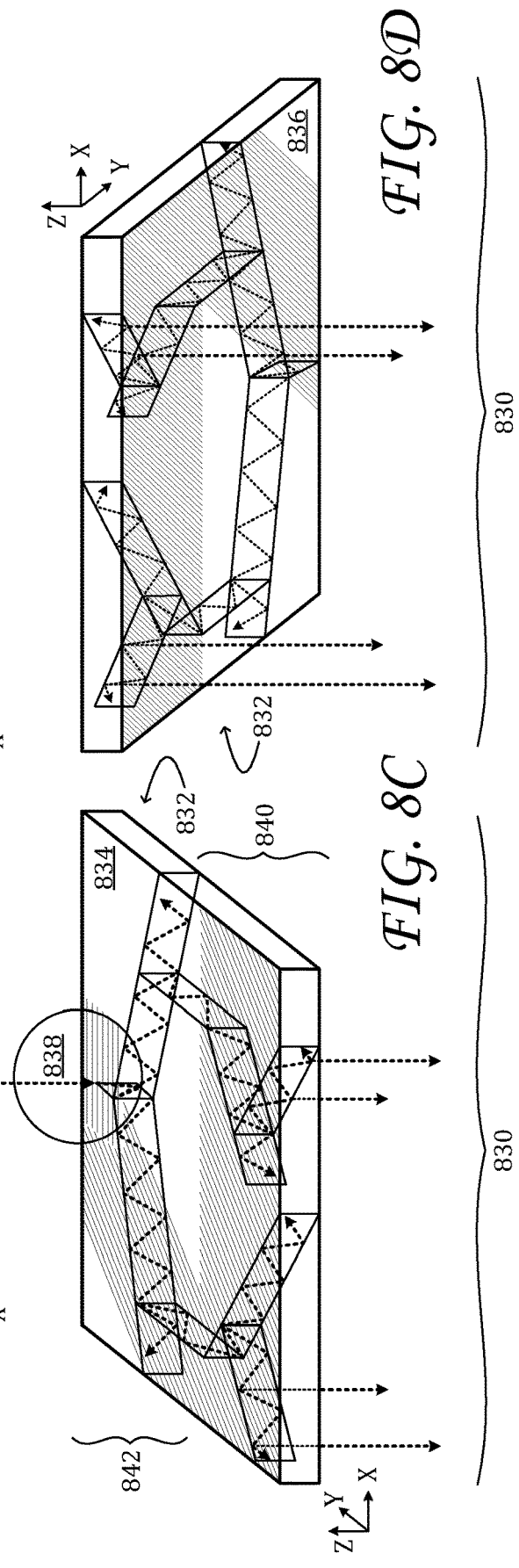

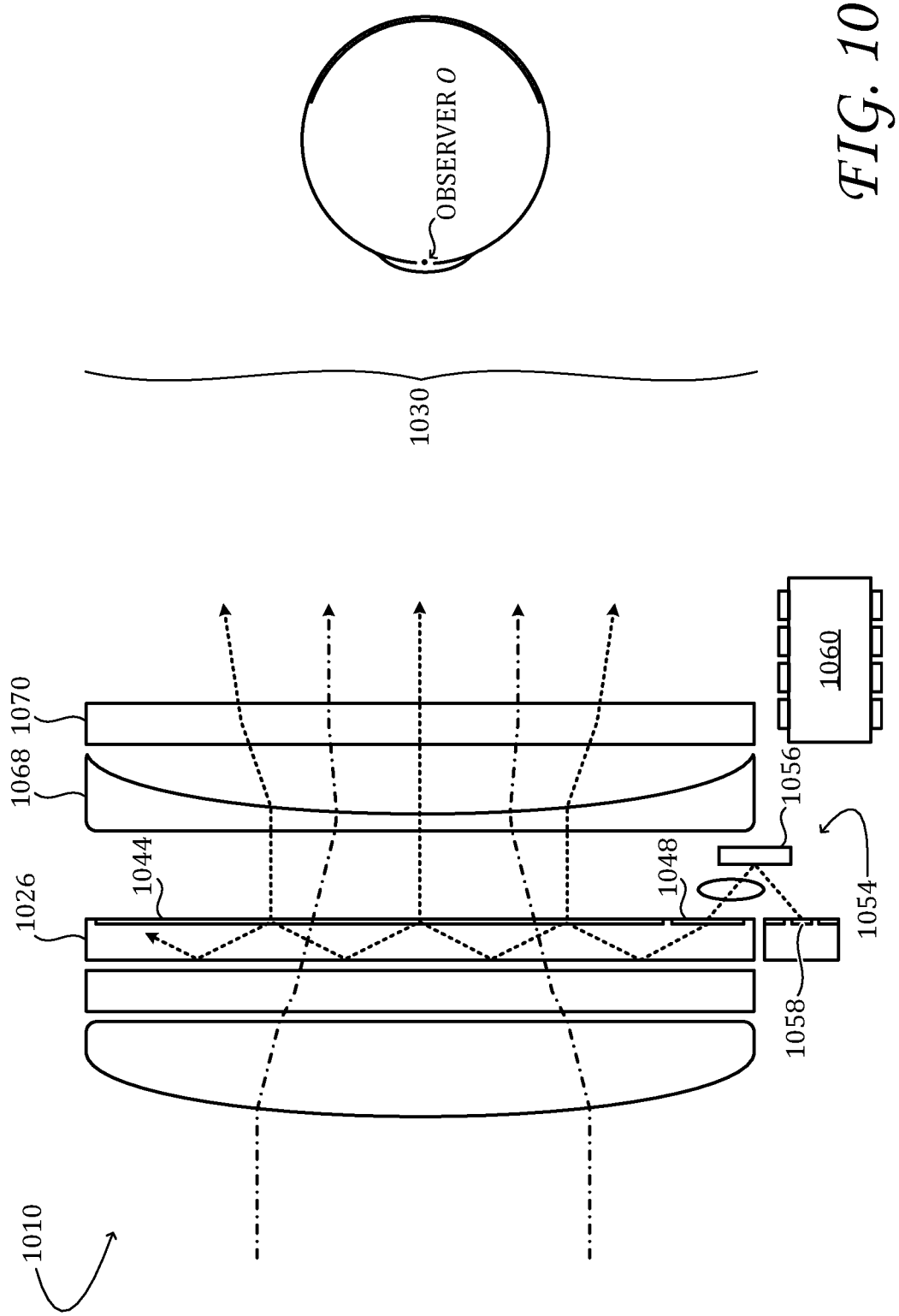

PUPIL EXPANDER WITH IMPROVED COLOR UNIFORMITY

CROSS REFERENCE TO RELATED APPLICATIONS

This application is a continuation-in-part of U.S. application Ser. No. 16/222,097 filed Dec. 17, 2018, which is a continuation of U.S. application Ser. No. 15/609,882 filed May 31, 2017, now granted as U.S. Pat. No. 10,175,423, the entirety of each of which is hereby incorporated herein by reference for all purposes.

BACKGROUND

In recent years, near-eye display technology has evolved from niche status into an emerging consumer technology. In head-worn display devices, for example, near-eye display systems provide 3D stereo vision for virtual-reality presentation. Typically, the objective optics of a near-eye display system are configured to transmit a display image through an area that is too small to be aligned reliably with the user's pupil. For that reason, associated eyepiece optics of the near-eye display system may include some form of pupil expander. The pupil expander spreads the display image over a larger area—e.g., over the entire area in which the user's pupil is likely to be found. Some pupil expanders include an optical waveguide supporting one or more diffraction gratings. The diffraction gratings couple the display image into and out of the waveguide and also provide the desired pupil-expansion function.

SUMMARY

One aspect of this disclosure is directed to an optical waveguide comprising one or more upstream diffraction gratings in addition to overlapping first and second downstream diffraction gratings. The one or more upstream diffraction gratings include a first upstream diffraction grating configured to receive display light and to release the display light expanded along a first axis. The first and second downstream diffraction gratings are configured to receive the display light expanded along the first axis and to cooperatively release the display light further expanded along a second axis. The first downstream diffraction grating is arranged on a planar face of the optical waveguide and is further configured to further expand along the first axis the display light expanded along the first axis.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

FIGS. 2A through 2D show aspects of an example pupil expander comprising an optical waveguide.

FIGS. 4A through 8D show aspects of example pupil expanders comprising optical waveguides configured for reduced color non-uniformity in the exit pupil.

FIG. 10 shows additional aspects of an example near-eye display system.

DETAILED DESCRIPTION

As noted above, an optical waveguide supporting in- and out-coupling diffraction gratings may provide pupil expansion in a near-eye display system. However, some pupil-expansion waveguides may cause unwanted variation in the intensity ratio of component wavelengths across the exit pupil, resulting in color non-uniformity in the expanded display image. In contrast to typical chromatic aberration, which blurs the image by shifting the field-of-view as a function of wavelength, a pupil-expansion waveguide may release a sharp image exhibiting a coloration that depends on the observer's eye location. Accordingly, the image color may vary depending on the region of the exit pupil through which the display image is observed. The color non-uniformity may be especially significant for optical waveguides that expand the display image sequentially along orthogonal or nearly orthogonal axes. As disclosed in greater detail herein, color non-uniformity is significantly reduced in waveguides wherein the second stage of display-image expansion is in a direction that obliquely opposes the image expansion of the first stage. This method of display-image expansion may be implemented in optical waveguides supporting crisscrossed diffraction gratings—e.g., diffraction gratings that overlap in the zone from which the expanded display image is released from the optical waveguide.

This disclosure presents a series of pupil-expansion waveguides by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

Figure 1:
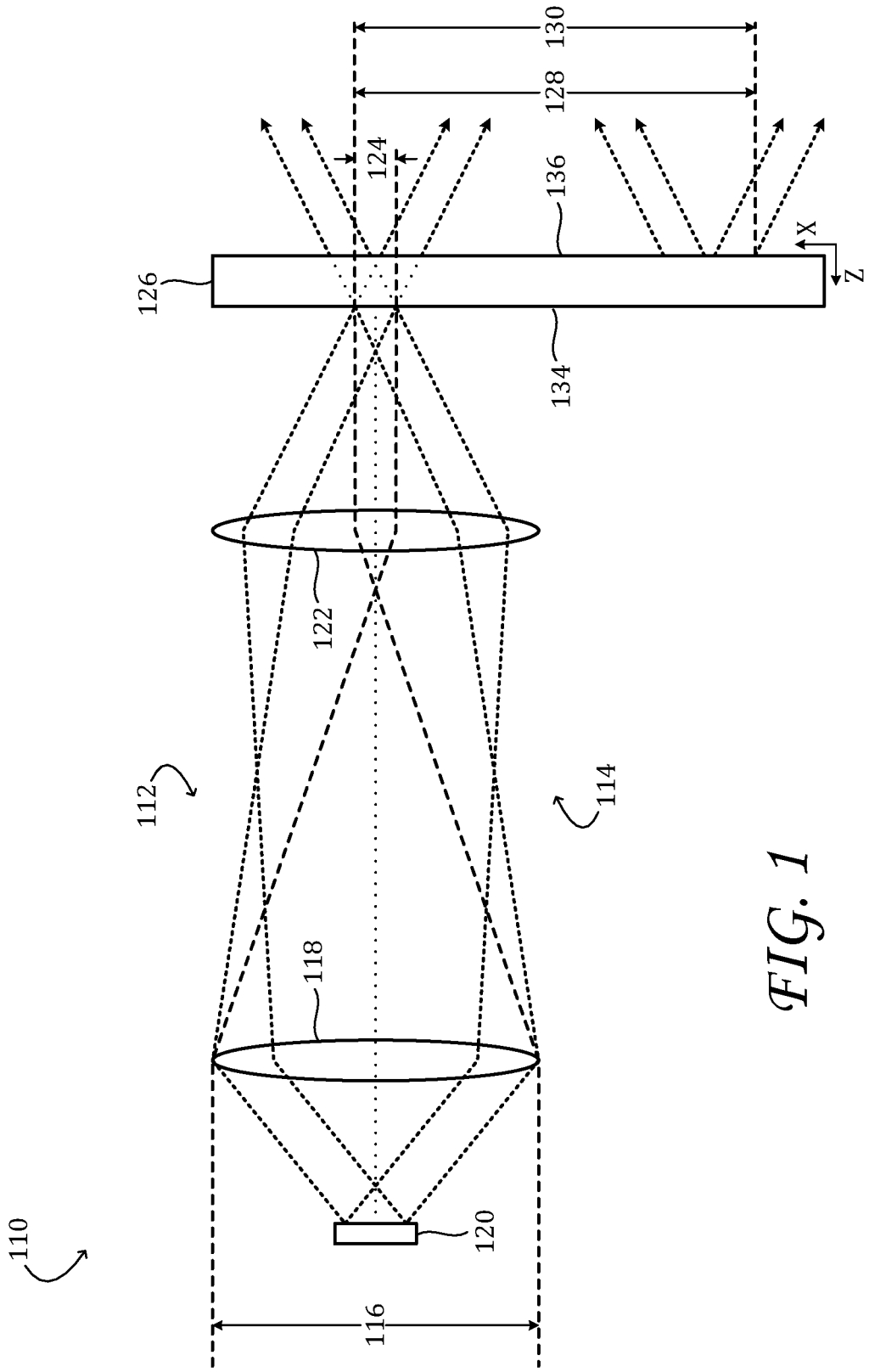
FIG. 1 shows aspects of an example near-eye display system.

FIG. 1 shows aspects of an example near-eye display system 110. The near-eye display system is configured to present a still or moving image to be viewed by a human observer—viz., by the user of the near-eye display system. Some aspects of near-eye display system 110 may vary from one example to the next. In the illustrated example, the near-eye display system is part of a virtual-reality or mixed-reality system that displays computer-generated imagery in the field-of-view of the observer. In other examples, the near-eye display system may be part of a microscope, telescope, binoculars, or other optical system. Generally speaking, near-eye display system 110 includes objective optics 112 that form and/or collect a display image and eyepiece optics 114 that present the display image to the observer. The description immediately below focuses on the eyepiece optics; example objective optics will be illustrated following that description.

In near-eye display system 110, display light from objective optics 112 passes through a physical aperture 116 of finite size. The size of the physical aperture may correspond, as shown in FIG. 1, to the diameter of a collection lens 118 arranged over a pixel array 120 of a display projector. The pixel array may comprise a spatial light modulator (SLM) or an organic light-emitting diode array, for instance. Various other objective optical configurations are also envisaged. Focal optics 122 may be configured to focus the display light onto an anatomical-pupil position of the observer. In doing so, the focal optics direct the display light through entry pupil 124, defined as the image of physical aperture 116 at the anatomical-pupil position.

Due to the small size of physical aperture 116 and/or due to other features of near-eye display system 110, entry pupil 124 may be quite small. In examples in which objective optics 112 comprise SLM or OLED projection componentry, the diameter of entry pupil 124 may be 3 millimeters or less. Maintaining alignment between an entry pupil of such size and an anatomical pupil is very difficult. When entry pupil 124 does not fill the observer's anatomical pupil, the observer may perceive a dark or vignetted display image, or no display image at all. Accordingly, near-eye display system 110 includes a pupil expander 126. The pupil expander has an entry face 134 and an exit face 136, which intersect entry pupil 124. The pupil expander is configured to receive the display light through the entry pupil and to release the display light optically downstream, over an expanded exit pupil 128. The exit pupil of the pupil expander may be large enough to cover the entire area over which the observer's pupil is likely be, in typical display-viewing scenarios. Such an area is referred to herein as an 'eyebox'—e.g., eyebox 130 in FIG. 1.

FIGS. 2A-D show additional aspects of pupil expander 126 in one non-limiting example. The pupil expander comprises an optical waveguide 232 in the form of a transparent (e.g., glass or polymer) slab. The optical waveguide has opposing planar faces, entry face 234 and exit face 236. FIG. 2A provides a plan view of entry face 234, while the view of exit face 236 in FIG. 2B is as seen through the entry face. Repeated in subsequent drawings, this rendering is selected so that the reader can more easily visualize the overlap between the diffraction gratings (vide infra) arranged on the entry and exit faces. The diffraction gratings are also shown in FIGS. 2C and 2D, which provide perspective views of the optical waveguide in two different rotations about a horizontal axis aligned to the forward edge.

The optical waveguide includes an entry zone 238 where display light is received through entry face 234 and an exit zone 240 from which the display light is released optically downstream, through exit face 236. In typical operating scenarios, the display light is received from objective optics 112 and is released into eyebox 230. Optical waveguide 232 also includes an initial-expansion zone 242 that receives the display light from entry zone 238 and expands the display light en route to exit zone 240.

Optical waveguide 232 includes a plurality of differently configured diffraction gratings distributed among entry zone 238, exit zone 240, and initial-expansion zone 242. The diffraction gratings are arranged on entry face 234 and/or exit face 236. The type of diffraction grating employed in optical waveguide 232 is not particularly limited. In some examples, a surface-relief type diffraction grating may be used. Such a grating may comprise a series of closely spaced channels formed on the supporting surface. In other examples, a volume grating or index-modulated diffraction grating may be used.

Each of the optical waveguides disclosed herein includes one or more 'upstream' diffraction gratings configured to direct display light onto at least one 'downstream' diffraction grating. In examples in which display light from entry zone 238 is expanded initially in opposing directions, the upstream diffraction gratings include a right-hand expansion grating 244R and a left-hand expansion grating 244L. In each of the drawings, the directions 'right' and 'left' are assigned from the perspective of the user of the near-eye display device—viz., looking into the exit face of the optical waveguide. In the particular example of FIGS. 2A-D, the right-hand expansion grating is arranged on entry face 234, and the left-hand expansion grating is arranged on exit face 236, both expansion gratings extending through initial-expansion zone 242 and overlapping in entry zone 238. Here, a downstream out-coupling grating 246 is arranged on entry face 234, in exit zone 240. In other examples, any, some, or all of the diffraction gratings enumerated above may be arranged on the opposite face of the optical waveguide, relative to the illustrated configuration.

Low-angle display light from objective optics 112 is received in entry zone 238 of optical waveguide 232, through entry face 234. In this example, right-hand expansion grating 244R and left-hand expansion grating 244L are each configured to couple the display light into the optical waveguide. Left-hand expansion grating 244L diffracts some of the display light obliquely rightward and downward at a supercritical angle, such that it now propagates through the optical waveguide by total internal reflection (TIR) from entry face 234 and exit face 236, in a rightward and downward direction. At each bounce from the entry face, the propagating light encounters right-hand expansion grating 244R, which diffracts portions of the light directly downward. For clarity of illustration, only a few of the downward-diffracted rays are shown in the drawings.

Interaction with right-hand expansion grating 244R expands the display light in the rightward direction and directs the rightward-expanded display light into exit zone 240. In addition, the right-hand expansion grating diffracts some of the incoming display light obliquely leftward and downward at a supercritical angle, such that it now propagates through the optical waveguide by TIR, but in a leftward and downward direction. Interaction with left-hand expansion grating 244L expands the display light in the leftward direction and directs the leftward-expanded display light toward the exit zone. In effect, the right- and left-hand expansion gratings receive display light and release the display light expanded in opposite directions along the X axis. So that the display light is released at a substantially uniform intensity across the right- and left-hand expansion gratings, the strength of each of the gratings is configured to vary gradually with distance along the grating—viz., the strength of right-hand expansion grating 244R increases rightward and the strength of left-hand expansion grating 244L increases leftward.

In exit zone 240, the propagating display light at each bounce from entry face 234 encounters out-coupling grating 246. The out-coupling grating diffracts portions of the rightward- and leftward-expanded display light out of optical waveguide 232, toward eyebox 230. For clarity of illustration, only a few of the out-coupled rays are shown in the drawings. In this manner, the display light is expanded in the downward direction—i.e., perpendicular to the rightward and leftward expansion effected by the right- and left-hand expansion gratings. In effect, the out-coupling grating receives the display light expanded along the X axis and releases the display light further expanded along the Y axis. So that the display light is released at a substantially uniform intensity along the out-coupling grating, the strength of the out-coupling grating is configured to increase gradually in the negative Y direction. This strategy may be applied generally to diffraction gratings that provide pupil expansion.

Primarily as an aid to understanding the drawings, the description herein refers to directions 'right', 'left', 'up', 'down', and so on. Such directions should be understood in a relative sense, as the display systems disclosed herein may be used in any absolute orientation. Moreover, for optical components having rotational and/or mirror-plane symmetry, the directions 'right' and 'left', or 'up' and 'down', may be exchanged throughout this description. Nevertheless, as the field-of-view of the human ocular system is larger in the natural horizontal direction than in the vertical, some optical componentry may be optimized to provide greater pupil expansion in the horizontal direction than in the vertical. In some implementations, therefore, the directions 'right' and 'left' are intended to be relative to the user and parallel to the user's transverse plane, which corresponds to the optically horizontal X axis in the drawings. Likewise, in some implementations, the directions 'up' and 'down' are intended to be relative to the user and parallel to the user's sagittal plane, which corresponds to the optically vertical Y axis in the drawings.

Figure 3:
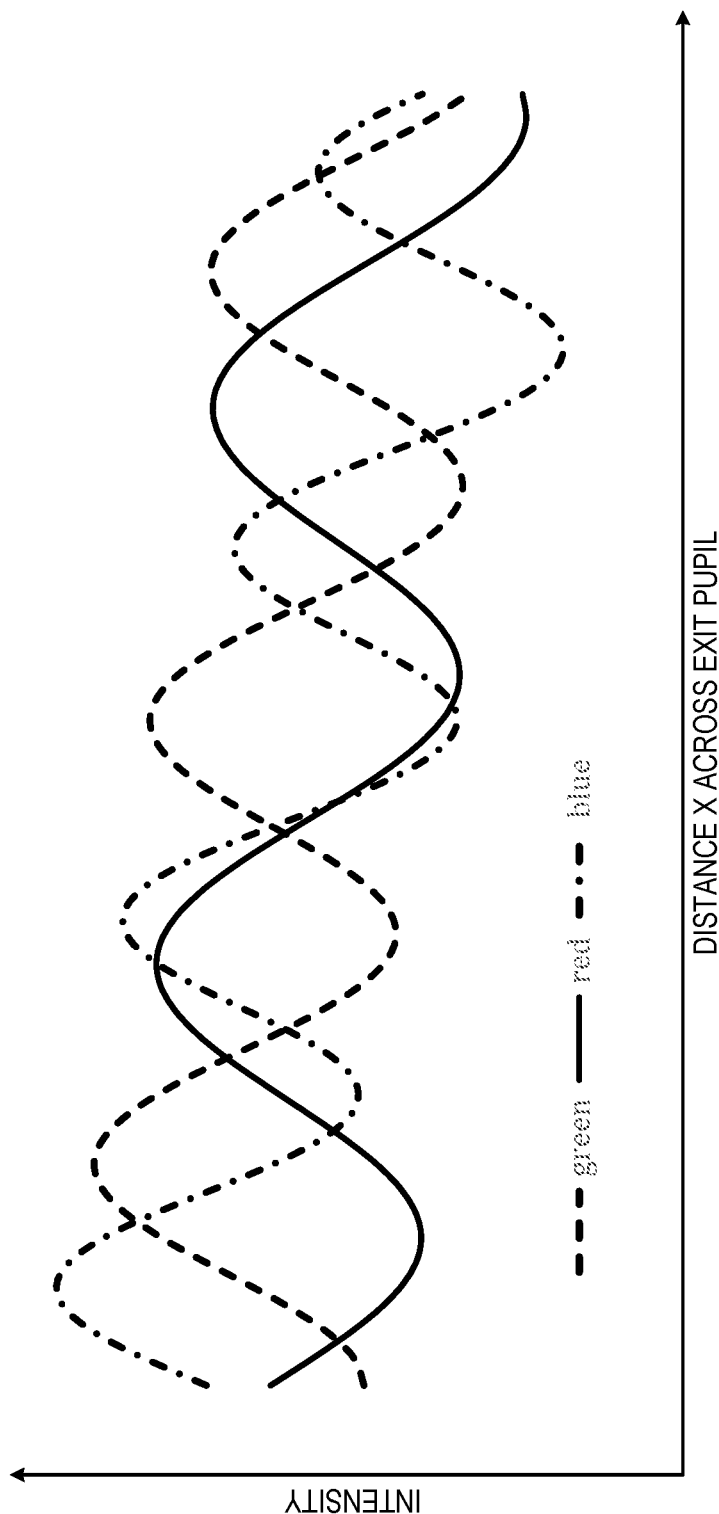
FIG. 3 is an example overlay plot of out-coupled intensity versus distance across the optical waveguide of the pupil expander of FIG. 2, for three different colors of visible light.

In some scenarios, the configuration of diffraction gratings in an optical waveguide may cause undesired color non-uniformity in the expanded display image—e.g., in the direction of the horizontal expansion. FIG. 3 illustrates the observed effect in a simplified example in which white light of uniform intensity is imaged onto the entry pupil of an optical waveguide as shown in FIGS. 2A-D. The plots represent out-coupled intensity of three different colors of light versus distance across the exit pupil. Here the downward-propagating pupil replication beams are observed as peaks at different locations, which depend on the color. Variation between the red, green, and blue intensities is an indication of the color non-uniformity. Because the distribution of peaks is located at the exit face of the optical waveguide, the observed pattern varies depending on the location of the observer's eye. Accordingly, the effect cannot be compensated by color-correction of the display image content.

Without tying all aspects of this disclosure to any particular theory, the color banding may be explained as follows. The output image from the pupil expander is located at a virtually 'infinite' distance, so each pixel of the display image corresponds to a particular ray angle; the different wavelengths have the same exit angle because the sum of the diffractions from all gratings in the optical path is zero (vide infra). However, due to dispersion, the zig-zag angles inside the optical waveguide depend on the wavelength. Expansion occurs as the beam (corresponding to a propagating pupil for a single image angle/pixel) is split, therefore, upon reaching the expansion grating. This occurs at different positions depending on the wavelength, so the out-coupled replicas of the exit pupil emerge at different positions, depending on the wavelength. This causes the intensity ratios of the out-coupled replicas to vary as a function of output location. Accordingly, the observer perceives a color non-uniformity that depends on his or her eye location.

FIGS. 4A-D shows aspects of pupil expander 126 in another non-limiting example. In optical waveguide 432, two distinct downstream diffraction gratings are arranged in exit zone 440: right-hand out-coupling grating 446R is arranged on entry face 434, and left-hand out-coupling grating 446L is arranged on exit face 436. The right- and left-hand out-coupling gratings overlap in exit zone 440 just as right- and left-hand expansion gratings 444R and 444L overlap in entry zone 438. Naturally, the 'overlap' of two or more diffraction gratings is recognized from a perspective normal to the one or more optical-waveguide faces on which the diffraction gratings are arranged. In the example of FIGS. 4A-D, display light propagating through exit zone 440 encounters right-hand out-coupling grating 446R at each bounce from entry face 434 and encounters left-hand out-coupling grating 446L at each bounce from exit face 436. The right- and left-hand out-coupling gratings diffract portions of the rightward and leftward-expanded display light out of optical waveguide 432 and toward eyebox 430, thereby expanding the display light in the downward direction, as in the previous example. However, the out-coupling function in optical waveguide 432 differs relative to the previous example in several important ways.

One difference is that the right- and left-hand out-coupling gratings of optical waveguide 432 also provide additional rightward and leftward (i.e., horizontal) expansion. Accordingly, the right- and left-hand out-coupling gratings further expand, in opposite directions along the X axis, the display light expanded along the X axis. The additional horizontal expansion means that the rays do not propagate in a single direction in the outcoupling region, but vary their direction, thereby eliminating the wavelength dependence on observation position noted above for optical waveguide 232. As a result, little or no color banding is observed in the exit pupil. Another difference relative to the previous example is that the out-coupling function here is achieved cooperatively, via successive diffractions from right-hand out-coupling grating 446R and left-hand out-coupling grating 446L. More specifically, neither the right- nor the left-hand out-coupling grating is itself configured to release the display light propagating directly downward from the upstream diffraction gratings. Rather, diffraction by right-hand out-coupling grating 446R reorients the propagating display light obliquely rightward, but at a supercritical angle that keeps it confined to the optical waveguide. At each bounce from exit face 436, such light encounters left-hand out-coupling grating 446L, which is configured to release the rightward-oriented display light from the optical waveguide. Conversely, diffraction of the downward-propagating display light by left-hand out-coupling grating 446L reorients the propagating display light obliquely leftward; at each bounce from entry face 434, such light the encounters right-hand out-coupling grating 446R, which is configured to release the leftward-oriented display light from the optical waveguide. In effect, the right- and left-hand out-coupling gratings receive the display light expanded along the X axis and cooperatively release from the optical waveguide the display light further expanded along the Y axis, via successive diffraction from the first and second downstream diffraction gratings. It will be noted that the directions of pupil expansion effected by the upstream and downstream diffraction gratings may be askew to each other. Accordingly, successive stages of expansion 'in opposite directions along an axis' indicates merely that once an axis is chosen, the direction of the second expansion projected onto that axis opposes the direction of the first expansion projected onto the same axis.

Although the pupil expanders described above include separate right- and left-hand expansion gratings in the initial-expansion zone, that aspect is not strictly necessary. In implementations where a somewhat narrower horizontal field-of-view is permissible, the entry pupil may be expanded in only one horizontal and one vertical direction. FIGS. 5A-B show aspects of a pupil expander based on an optical waveguide 532 configured in this manner.

Optical waveguide 532 includes a dedicated in-coupling grating 548 arranged in entry zone 538. The in-coupling grating diffracts the display light rightward at a supercritical angle, such that it propagates through optical waveguide 532, toward initial-expansion zone 542. Within the initial-expansion zone, at each bounce from entry face 534, the propagating light encounters right-hand expansion grating 544R. The right-hand expansion grating diffracts portions of that light downward, toward exit zone 540. This action expands the display light in the rightward direction and directs the rightward-expanded display light to the exit zone. Display light propagating through exit zone 540 encounters right-hand out-coupling grating 546R at each bounce from entry face 534 and encounters left-hand out-coupling grating 546L at each bounce from exit face 536. Cooperatively, via successive diffraction from the right and left-hand out-coupling gratings, portions of the rightward- and leftward-expanded display light are diffracted out of optical waveguide 532 and toward the eyebox, thereby expanding the display light in the downward direction. In this example, the right and left-hand out-coupling gratings provide additional rightward and leftward expansion, which prevents color banding in the exit pupil as noted hereinabove. In this and other configurations, at least one of the downstream out-coupling gratings expands the display light in an opposite direction along the X axis relative to the direction of expansion effected by an upstream expansion grating. As shown in FIG. 5, the downstream out-coupling grating that expands the display light in the opposite direction may be arranged on the opposite face of the waveguide, relative to the upstream expansion grating. In other examples, the upstream expansion grating and the downstream out-coupling grating may be arranged on the same face.

The optical waveguides illustrated in FIGS. 4A-D and 5A-B include right-hand expansion and right-hand out-coupling gratings, which may be arranged on the same face of the optical waveguide; the optical waveguide illustrated in FIG. 4A-D also includes a left-hand expansion and left-hand out-coupling grating, which likewise may be arranged on the same face. In these examples, the orientation and/or pitch of corresponding horizontal expansion and out-coupling gratings may be equivalent, for ease of manufacture. That feature is not necessary, however. In other examples, the orientation and/or pitch of corresponding horizontal expansion and out-coupling gratings may differ, even for gratings arranged on the same face of an optical waveguide. FIGS. 6 and 7 illustrate these variants. As shown in the drawings, each of the out-coupling gratings 646R, 646L, and 746R have narrower pitch than corresponding expansion gratings 644R, 644L, and 744R, respectively, which are arranged on the same face. Furthermore, each out-coupling grating in FIGS. 6 and 7 differs in orientation from its corresponding expansion grating. More generally, any combination of gratings that obey the appropriate grating-vector summation rule will provide the appropriate function in the outcoupling region. In brief, each diffraction grating i through which the display light passes may be characterized by a wave vector $D_i$. In that formalism, the condition for the desired out-coupling is that wave vectors of all such gratings sum to zero. The grating-vector summation rule is further described in U.S. Pat. No. 10,241,346 to Tervo, which is hereby incorporated herein by reference, for all purposes.

Based on the above principle, the orientation and pitch of the individual out-coupling gratings may be optimized in a manner independent of the orientation or pitch of the corresponding horizontal expansion gratings, even in configurations in which the corresponding gratings occupy the same face of an optical waveguide. This provides an advantage of flexibility in the overall configuration of the optical system, relative to configurations in which any diffraction grating on a given face of an optical waveguide is constrained to have the same orientation and/or pitch. The ability to form and precisely position, on the same face of a waveguide, plural diffraction gratings differing in orientation and/or pitch is a result of improved manufacturing. Accordingly, plural, discontinuous gratings that differ in orientation and/or pitch may be arranged on the entry face and/or exit face of an optical waveguide as disclosed herein.

FIG. 8A-D show aspects of pupil expander 126 in another non-limiting example. Optical waveguide 832 includes a dedicated in-coupling grating 848 arranged in entry zone 838. As illustrated, the in-coupling grating is arranged on entry face 834 of optical waveguide 832, together with right-hand expansion grating 844R and right-hand out-coupling grating 846R. Again, any, some, or all of the diffraction gratings enumerated above may be arranged on the opposite face of the optical waveguide, relative to the illustrated configuration. As in the examples shown in FIGS. 5 and 7, the in-coupling grating is an upstream diffraction grating that couples the display light into the optical waveguide and directs the display light to the appropriate upstream expansion grating. More particularly, in-coupling grating 848 diffracts the display light to a supercritical angle, at which it may interact with right-hand expansion grating 844R at each bounce from entry face 834, or, with left-hand expansion grating 844L at each bounce from exit face 836. Left-hand expansion grating 844L diffracts light from the in-coupling grating obliquely rightward and downward. At each bounce from the entry face, right-hand expansion grating 844R diffracts portions of that light directly downward, toward exit zone 840. This action expands the display light in the rightward direction and directs the rightward-expanded display light downward toward the exit zone. Conversely, right-hand expansion grating 844R diffracts light from in-coupling grating obliquely leftward and downward. At each bounce from the exit face, the left-hand expansion grating diffracts portions of that light directly downward, toward exit zone 840. Within the exit zone, the display light is expanded in the downward direction and released into eyebox 830, as described above.

It has been noted in the description above that a diffraction grating configured for in-coupling, out-coupling, and/or initial expansion can generally be arranged on either the entry face or the exit face of an optical waveguide. Accordingly, virtually any diffraction grating in the above description may be relocated to the corresponding zone of the opposite face of the optical waveguide, with no loss of functionality. Relocation is envisaged even when a differently configured diffraction grating is already present in the corresponding zone of the opposite face, as plural diffraction gratings differing in orientation may occupy the same area of a given face. In addition, overlapping gratings of the same or different prescription may be arranged on both the entry and exit faces, to achieve cooperatively any desired diffractive function on the display light propagating through a waveguide. Such diffractive functions may include in-coupling, expansion in one or more directions, and out-coupling, for example.

Figure 9:
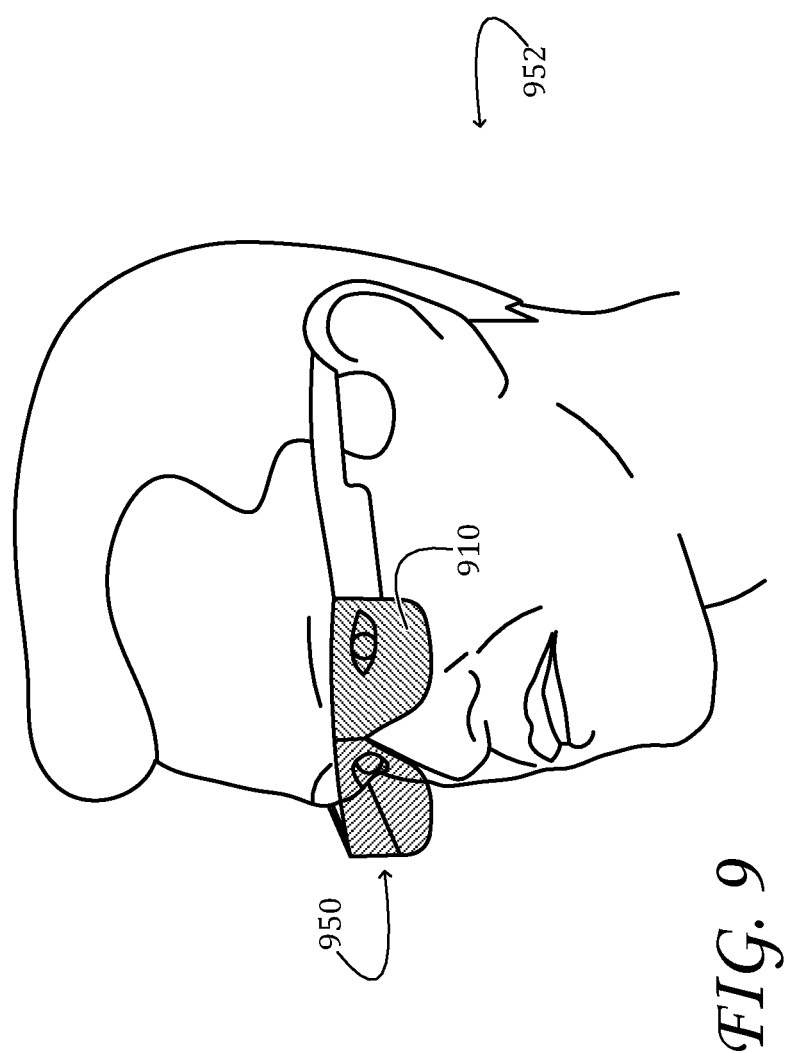
FIG. 9 shows aspects of an example implementation environment for a near-eye display system.

FIG. 9 shows aspects of an example implementation environment for a near-eye display system 910. As illustrated herein, the near-eye display system may be a component of wearable electronic device 950, which is worn and operated by user 952. The near-eye display system of FIG. 9 is configured to present virtual imagery in the user's field-of-view. In some implementations, user-input componentry of the wearable electronic device may enable the user to interact with the virtual imagery. Wearable electronic device 950 takes the form of eyeglasses in the example of FIG. 9. In other examples, the wearable electronic device may take the form of goggles, a helmet, or a visor. In still other examples, the near-eye display system may be a component of a non-wearable electronic device.

Near-eye display system 910 may be configured to cover one or both eyes of user 952 and may be adapted for monocular or binocular image display. In examples in which the near-eye display system covers only one eye, but binocular image display is desired, a complementary near-eye display system may be arranged over the other eye. In examples in which the near-eye display system covers both eyes and binocular image display is desired, the virtual imagery presented by near-eye display system 910 may be divided into right and left portions directed to the right and left eyes, respectively. In scenarios in which stereoscopic image display is desired, the virtual imagery from the right and left portions, or complementary near-eye display systems, may be configured with appropriate stereo disparity (vide infra) so as to present a three-dimensional subject or scene.

FIG. 10 shows additional aspects of an example near-eye display system. Near-eye display system 1010 includes upstream optics in the form of a display projector 1054 configured to emit display light. The display projector of FIG. 10 includes a high-resolution spatial light modulator (SLM) 1056 illuminated by one or more light emitters 1058. The light emitters may comprise light-emitting diodes (LEDs) or laser diodes, and the SLM may comprise a liquid-crystal-on-silicon (LCOS) or digital micromirror array, for example. The SLM and the light emitters of the display projector are coupled operatively to display controller 1060. The display controller controls the matrix of independent, light-directing pixel elements of the SLM so as to cause the SLM to modulate the light received from the light emitters and thereby form the desired display image. By controlling the light modulation temporally as well as spatially, the display controller may cause the display projector to project a synchronized sequence of display images (i.e., video). In the example shown in FIG. 10, the display image is formed by reflection from the SLM. In other examples, a display image may be formed by transmission through a suitably configured, transmissive SLM. Display projectors based on other technologies are also envisaged—organic LED arrays, raster-scanning laser beams, etc.

Near-eye display system 1010 includes at least one pupil expander 1026 configured to receive the display light from display projector 1054. The display light is received via in-coupling grating 1048 and is released into eyebox 1030 via out-coupling grating 1044. Each display image formed by the near-eye display system is a virtual image presented at a predetermined distance $Z_0$ in front of observer O. The distance $Z_0$ is also referred to as the 'depth of the focal plane' of the display image. In some near-eye display configurations, the value of $Z_0$ is a fixed function of the design parameters of display projector 1054, which include fixed eyepiece lens 1068. Based on the permanent configuration of these structures, the focal plane may be positioned at a desired depth—at infinity, at 300 centimeters (cm), or at 200 cm, for example.

A stereoscopic near-eye display system employing a fixed focal plane may be capable of presenting virtual-display imagery perceived to lie at a controlled, variable distance in front of, or behind, the fixed focal plane. This effect can be achieved by controlling the horizontal disparity of each pair of corresponding pixels of the right and left stereo images. Usable also to impart three-dimensionality to a virtual display image, this approach will be understood with reference to FIGS. 11A and 11B.

Figure 11B:
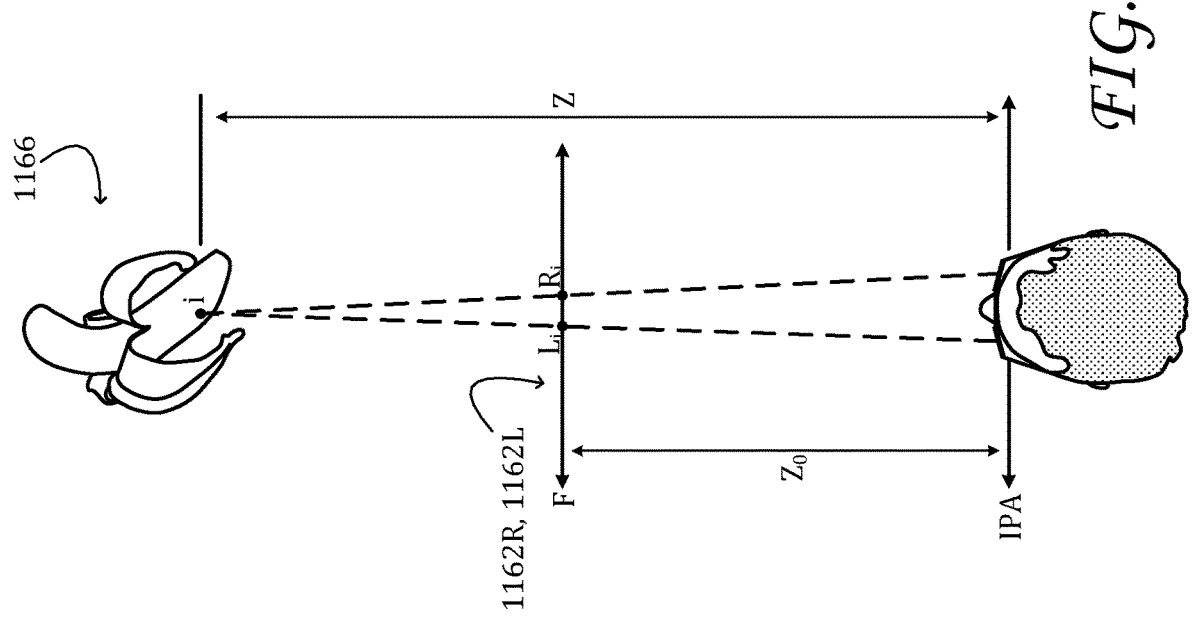
FIGS. 11A and 11B illustrate the effect of stereo disparity on virtual-image display in an example near-eye display system.
Figure 11A:
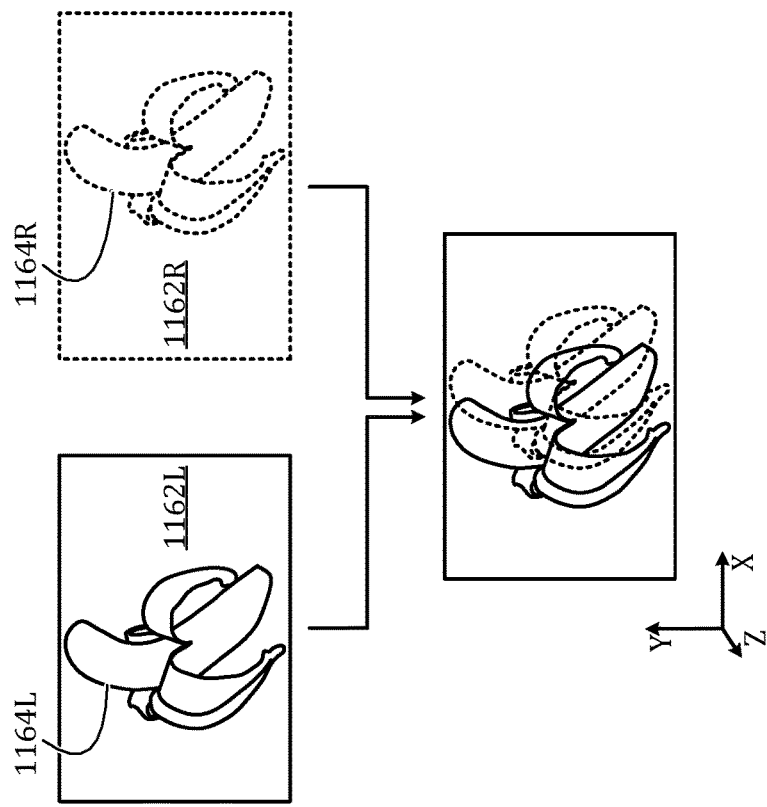

FIG. 11A shows right and left image frames 1162R and 1162L, overlaid upon each other for purpose of illustration. The right image frame encloses right display image 1164R, and the left image frame encloses left display image 1164L. Viewed concurrently through a stereoscopic near-eye display device, the right and left display images may appear to the observer as virtual imagery. In the example of FIG. 11A, the virtual imagery presents a viewable surface of individually rendered loci.

With reference to FIG. 11B, each locus i of the viewable surface has a depth coordinate $Z_i$ associated with each pixel $(X_i, Y_i)$ of the right and left display images. The desired depth coordinate may be simulated as follows. At the outset, a distance $Z_0$ to a focal plane F of the stereoscopic near-eye display system is chosen. As noted above, the optical componentry of the stereoscopic near-eye display system may be configured to present each display image at a vergence appropriate for the chosen distance. In one example, $Z_0$ may be set to 'infinity', so that each optical system presents a display image in the form of collimated light rays. In another example, $Z_0$ may be set to 200 cm, and the optical system may present each display image in the form of diverging light. In some examples, $Z_0$ may be chosen at design time and remain unchanged for all virtual imagery presented by the display system. Alternatively, the optical systems may be configured with electronically adjustable optical power, via variable eyepiece lens 1070 of FIG. 10, to allow $Z_0$ to vary dynamically according to the range of distances over which the virtual imagery is to be presented.

Once the distance $Z_0$ to the focal plane has been established, the depth coordinate Z for every locus i on the viewable surface may be set. This is done by adjusting the positional disparity of the two pixels corresponding to locus i in the right and left display images relative to their respective image frames. In FIG. 11B, the pixel corresponding to locus i in the right image frame is denoted $R_i$, and the corresponding pixel of the left image frame is denoted $L_i$. In FIG. 11B, the positional disparity is positive—i.e., $R_i$ is to the right of $L_i$ in the overlaid image frames. Positive positional disparity causes locus i to appear behind focal plane F. If the positional disparity were negative, the locus would appear in front of the focal plane. Finally, if the right and left display images were superposed (no disparity, $R_i$ and $L_i$ coincident) then the locus would appear to lie directly on the focal plane. Without tying this disclosure to any particular theory, the positional disparity D may be related to Z, $Z_0$, and to the interpupillary distance (IPD) of the observer by $$D = IPD \times \left(1 - \frac{Z_0}{Z}\right).$$

In the approach described above, the positional disparity sought to be introduced between corresponding pixels of the right and left display images is 'horizontal' disparity—viz., disparity parallel to the interpupillary axis of the observer. Horizontal disparity partially mimics the effect of real-object depth on the human visual system, where images of a real object received in the right and left eyes are naturally offset parallel to the interpupillary axis.

In one implementation, logic in display controller 1060 maintains a model of the Cartesian space in front of the observer, in a frame of reference fixed to near-eye display system 1010. The observer's pupil positions are mapped onto this space, as are the image frames 1162R and 1162L, each positioned at the predetermined depth $Z_0$. Then, virtual imagery 1166 is constructed, with each locus i of the viewable surface of the imagery having coordinates $X_i$, $Y_i$, and $Z_i$, in the common frame of reference. For each locus of the viewable surface, two-line segments are constructed—a first line segment to the pupil position of the observer's right eye and a second line segment to the pupil position of the observer's left eye. The pixel $R_i$ of the right display image, which corresponds to locus i, is taken to be the intersection of the first line segment in right image frame 1164R. Likewise, the pixel $L_i$ of the left display image is taken to be the intersection of the second line segment in left image frame 1164L. This procedure automatically provides the appropriate amount of shifting and scaling to correctly render the viewable surface, placing every locus i at the appropriate distance and with the appropriate perspective. In some examples, the approach outlined above may be facilitated by real-time estimation of the observer's pupil positions. In examples in which pupil estimation is not attempted, a suitable surrogate for the pupil position, such as the center of rotation of the pupil position, or eyeball position, may be used instead.

3D display rendering may be tied to a computer of one or more computing devices, such as display controller 1060 of FIG. 10. That method may be implemented as an application program or service, an application programming interface (API), a library, and/or other computer-program product.

Display controller 1060 includes a logic system and a computer-memory system. Display controller 1060 may optionally include an input system, a communication system, and/or other systems not shown in the drawings.

The logic system includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

The computer-memory system includes at least one physical device configured to temporarily and/or permanently hold computer information, such as data and instructions executable by the logic system. When the computer-memory system includes two or more devices, the devices may be collocated or remotely located. Computer-memory system may include at least one volatile, nonvolatile, dynamic, static, read/write, read-only, random-access, sequential-access, location-addressable, file-addressable, and/or content-addressable computer-memory device. The computer-memory system may include at least one removable and/or built-in computer-memory device. When the logic system executes instructions, the state of computer-memory system may be transformed—e.g., to hold different data.

Aspects of the logic system and the computer-memory system may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

The logic system and the computer-memory system may cooperate to instantiate one or more logic machines or engines. As used herein, the terms 'machine' and 'engine' each refer collectively to a combination of cooperating hardware, firmware, software, instructions, and/or any other components that provide computer functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer processor) cooperating with a remote component (e.g., a cloud computing service provided by a network of one or more server computers). The software and/or other instructions that give a particular machine or engine its functionality may optionally be saved as one or more unexecuted modules on one or more computer-memory devices.

When included, an input system may comprise or interface with one or more input devices. An input device may include a sensor device or a user input device. Examples of user input devices include a keyboard, mouse, touch screen, and/or machine-vision system configured for gesture recognition. When included, a communication system may be configured to communicatively couple display controller 1060 with one or more other computers. The communication system may include wired and/or wireless communication devices compatible with one or more different communication protocols. The communication system may be configured for communication via personal-, local- and/or wide-area networks.

One aspect of this disclosure is directed to an optical waveguide comprising one or more upstream diffraction gratings and overlapping first and second downstream diffraction gratings. The one or more upstream diffraction gratings include a first upstream diffraction grating configured to receive display light and to release the display light expanded along a first axis. The overlapping first and second downstream diffraction gratings are configured to receive the display light expanded along the first axis and to cooperatively release the display light further expanded along a second axis. The first downstream diffraction grating is arranged on a planar face of the optical waveguide and is configured to further expand along the first axis the display light expanded along the first axis.

In some implementations, at least one of the one or more upstream diffraction gratings is arranged on the planar face. In some implementations, the first downstream diffraction grating differs in orientation from the at least one of the one or more upstream diffraction gratings arranged on the planar face. In some implementations, the first downstream diffraction grating differs in pitch from the at least one of the one or more upstream diffraction gratings arranged on the planar face. In some implementations, the first downstream diffraction grating is discontinuous from the at least one of the one or more upstream diffraction gratings arranged on the planar face. In some implementations, the at least one of the one or more upstream diffraction gratings arranged on the planar face includes the first upstream diffraction grating. In some implementations, the one or more upstream diffraction gratings includes a second upstream diffraction grating configured to receive the display light and to release the display light expanded along the first axis, and the first and second upstream diffraction gratings are configured to expand the display light in opposite directions along the first axis. In some implementations, the second downstream diffraction grating is configured to further expand along the first axis the display light expanded along the first axis, and the first and second downstream diffraction gratings are configured to further expand, in opposite directions along the first axis, the display light expanded along the first axis. In some implementations, the first and second downstream diffraction gratings are arranged on opposite faces of the optical waveguide. In some implementations, the first axis is an optically horizontal axis and the second axis is an optically vertical axis. In some implementations, the one or more upstream diffraction gratings includes an in-coupling diffraction grating configured to couple the display light into the optical waveguide, and the first upstream diffraction grating is configured to receive the display light from the in-coupling diffraction grating. In some implementations, the first upstream diffraction grating is configured to couple the display light into the optical waveguide. In some implementations, the first and second downstream diffraction gratings are configured to cooperatively release from the optical waveguide the display light further expanded along the first and second axes, via successive diffractions from the first and second downstream diffraction gratings.

Another aspect of this disclosure is directed to a near-eye display system comprising a display projector configured to direct display light through an entry pupil and an optical waveguide having a planar face intersecting the entry pupil. The optical waveguide comprises one or more upstream diffraction gratings and first and second downstream diffraction gratings overlapping from a perspective normal to the planar face. The one or more upstream diffraction gratings include a first upstream diffraction grating configured to receive the display light and to release the display light expanded along a first axis. The first and second downstream diffraction gratings are configured to receive the display light expanded along the first axis and to cooperatively release the display light further expanded along a second axis. The first downstream diffraction grating is arranged on the planar face of the optical waveguide and is further configured to further expand, along the first axis, the display light expanded along the first axis.

In some implementations, at least one of the one or more upstream diffraction gratings is arranged on the planar face. In some implementations, the first downstream diffraction grating differs in orientation and/or pitch from the at least one of the one or more upstream diffraction gratings arranged on the planar face. In some implementations, the first downstream diffraction grating is discontinuous from the at least one of the one or more upstream diffraction gratings arranged on the planar face.

Another aspect of this disclosure is directed to an optical waveguide comprising an upstream diffraction grating and overlapping downstream diffraction gratings. The upstream diffraction grating is configured to receive display light and to release the display light expanded along a first axis. The overlapping downstream diffraction gratings are configured to receive the display light expanded along the first axis and, via successive diffractions from the overlapping downstream diffraction gratings, to release the display light further expanded along the first axis and along a second axis. The overlapping downstream diffraction gratings are configured to expand the display light in opposite directions along the first axis.

In some implementations, the overlapping downstream diffraction gratings are arranged on opposite faces of the optical waveguide. In some implementations, the upstream diffraction grating and at least one of the overlapping downstream diffraction gratings are arranged on the same face the optical waveguide, and the upstream diffraction grating is discontinuous from the at least one of the overlapping downstream diffraction gratings.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical waveguide comprising:
one or more upstream diffraction gratings including a first upstream diffraction grating configured to receive display light and to release the display light expanded along a first axis; and
overlapping first and second downstream diffraction gratings configured to receive the display light expanded along the first axis and to cooperatively release the display light further expanded along a second axis,
wherein the first downstream diffraction grating is arranged on a planar face of the optical waveguide and is configured to further expand along the first axis the display light expanded along the first axis.

2. The optical waveguide of claim 1 wherein at least one of the one or more upstream diffraction gratings is arranged on the planar face.

3. The optical waveguide of claim 2 wherein the first downstream diffraction grating differs in orientation from the at least one of the one or more upstream diffraction gratings arranged on the planar face.

4. The optical waveguide of claim 2 wherein the first downstream diffraction grating differs in pitch from the at least one of the one or more upstream diffraction gratings arranged on the planar face.

5. The optical waveguide of claim 2 wherein the first downstream diffraction grating is discontinuous from the at least one of the one or more upstream diffraction gratings arranged on the planar face.

6. The optical waveguide of claim 2 wherein the at least one of the one or more upstream diffraction gratings arranged on the planar face includes the first upstream diffraction grating.

7. The optical waveguide of claim 1 wherein the one or more upstream diffraction gratings includes a second upstream diffraction grating configured to receive the display light and to release the display light expanded along the first axis, wherein the first and second upstream diffraction gratings are configured to expand the display light in opposite directions along the first axis.

8. The optical waveguide of claim 1 wherein the second downstream diffraction grating is configured to further expand along the first axis the display light expanded along the first axis, and wherein the first and second downstream diffraction gratings are configured to further expand, in opposite directions along the first axis, the display light expanded along the first axis.

9. The optical waveguide of claim 1 wherein the first and second downstream diffraction gratings are arranged on opposite faces of the optical waveguide.

10. The optical waveguide of claim 1 wherein the first axis is an optically horizontal axis and the second axis is an optically vertical axis.

11. The optical waveguide of claim 1 wherein the one or more upstream diffraction gratings includes an in-coupling diffraction grating configured to couple the display light into the optical waveguide, and wherein the first upstream diffraction grating is configured to receive the display light from the in-coupling diffraction grating.

12. The optical waveguide of claim 1 wherein the first upstream diffraction grating is configured to couple the display light into the optical waveguide.

13. The optical waveguide of claim 1 wherein the first and second downstream diffraction gratings are configured to cooperatively release from the optical waveguide the display light further expanded along the first and second axes, via successive diffractions from the first and second downstream diffraction gratings.

14. A near-eye display system comprising:
a display projector configured to direct display light through an entry pupil; and
an optical waveguide having a planar face intersecting the entry pupil, the optical waveguide comprising:
one or more upstream diffraction gratings including a first upstream diffraction grating configured to receive the display light and to release the display light expanded along a first axis, and
first and second downstream diffraction gratings overlapping from a perspective normal to the planar face and configured to receive the display light expanded along the first axis and to cooperatively release the display light further expanded along a second axis,
wherein the first downstream diffraction grating is arranged on the planar face of the optical waveguide and is further configured to further expand, along the first axis, the display light expanded along the first axis.

15. The near-eye display system of claim 14 wherein at least one of the one or more upstream diffraction gratings is arranged on the planar face.

16. The near-eye display system of claim 15 wherein the first downstream diffraction grating differs in orientation and/or pitch from the at least one of the one or more upstream diffraction gratings arranged on the planar face.

17. The near-eye display system of claim 15 wherein the first downstream diffraction grating is discontinuous from the at least one of the one or more upstream diffraction gratings arranged on the planar face.

18. An optical waveguide comprising:
an upstream diffraction grating configured to receive display light and to release the display light expanded along a first axis; and
overlapping downstream diffraction gratings configured to receive the display light expanded along the first axis and, via successive diffractions from the overlapping downstream diffraction gratings, to release the display light further expanded along the first axis and along a second axis,
wherein the overlapping downstream diffraction gratings are configured to expand the display light in opposite directions along the first axis.

19. The optical waveguide of claim 18 wherein the overlapping downstream diffraction gratings are arranged on opposite faces of the optical waveguide.

20. The optical waveguide of claim 18 wherein the upstream diffraction grating and at least one of the overlapping downstream diffraction gratings are arranged on the same face the optical waveguide, and wherein the upstream diffraction grating is discontinuous from the at least one of the overlapping downstream diffraction gratings.

* * * * *